No. 833,168. PATENTED OCT. 16, 1906.
J. R. KELLER.
SCALE GUARD AND MARKER.
APPLICATION FILED AUG. 14, 1905.
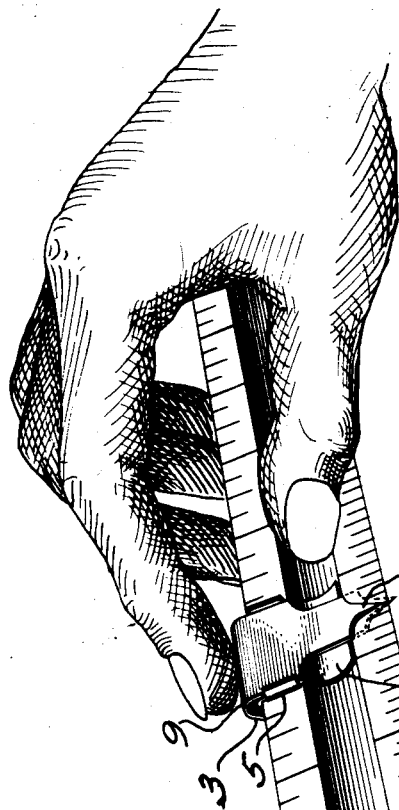
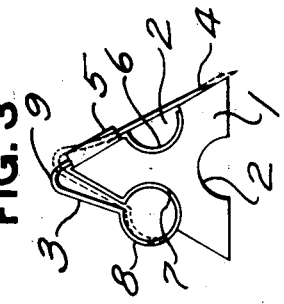
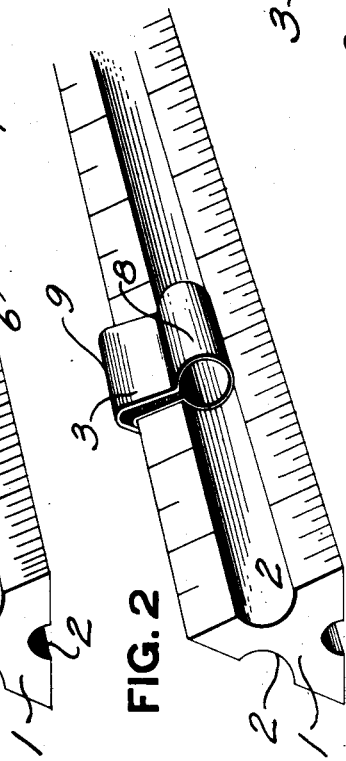
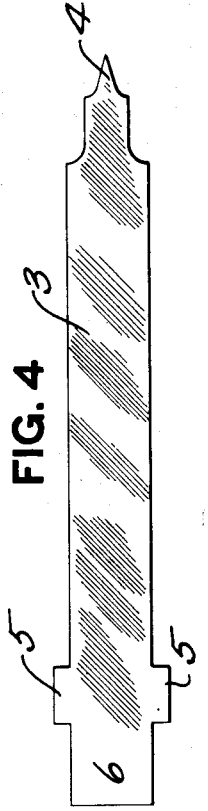
WITNESSES.
INVENTOR.

UNITED STATES PATENT OFFICE.

JOHN R. KELLER, OF PITTSBURG, PENNSYLVANIA, ASSIGNOR TO EDWARD F. SEELIG, OF CHICAGO, ILLINOIS.

SCALE GUARD AND MARKER.

No. 833,168.  Specification of Letters Patent.  Patented Oct. 16, 1906.

Application filed August 14, 1905. Serial No. 274,154.

*To all whom it may concern:*

Be it known that I, JOHN R. KELLER, a citizen of the United States of America, and a resident of Pittsburg, in the county of Allegheny and State of Pennsylvania, have invented certain new and useful Improvements in Scale Guards and Markers, of which the following is a specification.

This invention relates to guard attachments for measuring-scales and to device for setting off measurements along the measuring edge of a scale by means of a pin-point mounted directly upon the scale.

The main objects of this invention are to provide a simple and inexpensive attachment for triangular scales which will serve the double purpose of scale-guard to indicate quickly to a draftsman which one of the measuring edges of the scale is being used and to assist him in setting off measurements by perforating his paper at the limits of such measurements and to provide a device of this character which may be entirely constructed of sheet metal. I accomplish these objects by the device shown in the accompanying drawings, in which—

Figure 1 is a perspective view of a triangular scale provided with a scale-guard and prick-punch attachment constructed according to this invention. Fig. 2 is a perspective view of the same, showing the attachment as viewed from the rear of Fig. 1. Fig. 3 is an end elevation of the scale and attachment. Fig. 4 is a development of the piece of sheet metal from which the scale-guard and prick-punch is constructed.

In the drawings, the scale 1 is an ordinary triangular scale adapted to rest on either of its faces and provided with graduations on each face and along each edge, as is usual in scales of this type. Each face of the scale has the usual longitudinal groove 2 extending along its middle line, and the transverse section of the scale is uniform throughout.

The scale guard and marker 3 is formed of a single strip of sheet metal cut to the shape shown in Fig. 4, being of substantially uniform width for the greater part of its length and being pointed at one end to form a pin-point 4, which serves as a marker. The strip of metal is provided with opposed transversely-extending lugs 5 near its other end. To form the guard, the lugs 5 are first bent upwardly at right angles to one face of the strip. The strip is then bent upon itself to the loop or handle 8 at its middle part. Both end parts are then arched toward the same side, the pointed part being outward. The inner part is bent to fit the upper edge of the scale and to form jaws 6 and 7, which engage the scale in the two grooves, which are adjacent to said upper edge. The resilience of the sheet metal normally urges the gripping-jaws 6 and 7 toward each other, so that the guard will slide along the scale, but will normally grip the same sufficiently tight to remain at any position to which it may be set along the same. The jaw 7 is a portion of the loop or handle 8. The arching of the outer part of the strip at 9 causes the same to extend over the top of the scale and lie between the guide-lugs 5 and across the graduated face of the scale, with the pin-point close to the measuring edge thereof and approximately in the same plane therewith. The bending of the strip at the handle 8 and at the point 9 is such that the pin-point 4 will normally lie close to the graduated edge, but slightly raised from the surface upon which the scale is resting. By pressing downwardly upon the guard at 9 the pin-point 4 is forced into the paper or other surface upon which the scale is resting, the movement of said pin-point being guided by the lugs 5. As soon as the pressure of the finger is released the parts of the guard will return to their normal position. (Indicated by the full lines in the drawings.) When pressure is exerted at 9 the parts assume the position indicated by dotted lines in Figs. 1 and 3.

In operation the scale is held firmly against the paper by one hand, and the guard is slid along the scale by grasping the handle 8 with the other hand. When the pin-point 4 has arrived at the desired graduation, it is driven into the paper by a downward pressure of the finger at 9. This guard also prevents accidental use of the wrong graduated edge of the scale, since the pointer is always on the side of the scale in use.

What I claim as my invention, and desire to secure by Letters Patent, is—

1. The combination of a graduated measuring-scale adapted to rest upon a plane surface, having graduations along one edge adjacent to said surface and having a part extending throughout its length in parallel relation with said graduated edge; and a guard formed of resilient sheet metal, bent to slidably engage said part and adapted through its resilient structure to grip said part; and a pin-point mounted on said guard and lying substantially in the plane of said graduated edge, said pin-point being integral with said guard and being normally lifted above the measuring edge of the scale through the resilient structure of said guard.

2. The combination of a graduated measuring-scale adapted to rest upon a plane surface, having graduations along one edge adjacent to said surface and having a part extending throughout its length in parallel relation with said graduated edge; and a guard formed of a single piece of resilient sheet metal, bent to slidably engage said part and adapted through its resilient structure to grip said part; and a pin-point mounted on said guard and lying substantially in the plane of said graduated edge, said pin-point being integral with said guard and being normally lifted above the measuring edge of the scale through the resilient structure of said guard.

3. The combination of a measuring-scale having a graduated face inclined to the base thereof, a guard formed of sheet metal, being adapted through elastic pressure to engage a portion of said scale above the base and being slidable longitudinally thereon, said guard being bent upon itself and having a part extending over the top of the scale and lying substantially in the plane of said graduated face, said part having a pin-point at its lower end, said guard being adapted through its resilient structure to normally raise said pin-point out of contact with the supporting-surface and being adapted to cause said pin-point to prick the supporting-surface when downward pressure is exerted on said guard.

4. The combination of a triangular scale having longitudinal grooves in two of its faces; and a scale-guard comprising a piece of resilient sheet metal bent around the edge of the scale which is between said grooved faces and slidably engaging said grooves and being then bent upon itself at one of said grooves and arched over the top of the scale to form a part extending transversely across the opposite face thereof, said part having a pin-point at its lower end adapted to prick a supporting-surface at the lower edge of the scale, said pin-point being normally lifted out of contact with said surface through the resilient structure of said guard, and an integral guide on said guard for directing the motion of said pin-point.

5. An article of manufacture, comprising a strip of sheet metal pointed at one end and having a pair of opposed lugs extending transversely from its edges near the other end, said strip being bent upon itself to form a loop or handle near its middle part, both of the end parts being then arched toward one side, the pointed part being outward, and the other part being bent near its end to form a clamp-jaw, adapted to coact with and normally urged toward the handle by the resilience of the strip, and said lugs being bent upward to serve as guides for the edges of said pointed part, substantially as described.

Signed at Chicago this 28th day of July, 1905.

JOHN R. KELLER.

Witnesses:
E. A. RUMMLER,
EDWARD F. SEELIG.